United States Patent [19]

Isomura et al.

[11] Patent Number: 5,729,405
[45] Date of Patent: Mar. 17, 1998

[54] DISK APPARATUS

[75] Inventors: Akihiro Isomura, Fussa; Isao Morita, Akishima, both of Japan

[73] Assignee: Kabushiki Kaisha Toshiba, Kawasaki, Japan

[21] Appl. No.: 877,374

[22] Filed: Jun. 17, 1997

Related U.S. Application Data

[63] Continuation of Ser. No. 688,821, Jul. 31, 1996, abandoned, which is a continuation of Ser. No. 505,994, Jul. 21, 1995, abandoned, which is a continuation of Ser. No. 357,095, Dec. 15, 1994, abandoned, which is a continuation of Ser. No. 173,179, Dec. 27, 1993, abandoned.

[30] Foreign Application Priority Data

Dec. 28, 1992 [JP] Japan ............ 4-349433

[51] Int. Cl.$^6$ ............................................. G11B 5/54
[52] U.S. Cl. ............................................. 360/105
[58] Field of Search ........................... 360/97.01, 104, 360/105, 106, 109

[56] References Cited

U.S. PATENT DOCUMENTS

| | | | |
|---|---|---|---|
| 5,023,736 | 6/1991 | Kelsic et al. | 360/105 |
| 5,025,335 | 6/1991 | Stefansky | 360/97.01 |
| 5,034,837 | 7/1991 | Schmitz | 360/105 |
| 5,170,300 | 12/1992 | Stefansky | 360/105 |
| 5,305,169 | 4/1994 | Anderson et al. | 360/105 |

FOREIGN PATENT DOCUMENTS

| | | | |
|---|---|---|---|
| 4-186575 | 7/1992 | Japan | 360/109 |
| 4-302877 | 10/1992 | Japan | 360/105 |

*Primary Examiner*—Stuart S. Levy
*Assistant Examiner*—William J. Klimowicz
*Attorney, Agent, or Firm*—Finnegan, Henderson, Farabow, Garrett & Dunner, L.L.P.

[57] ABSTRACT

A disk apparatus comprises a carriage rotatably arranged in the case, and a magnetic head supported on the carriage. A voice coil motor for rotating the carriage includes a yoke fixed to the case, a magnet fixed to the yoke, and a coil mounted on the carriage and facing the magnet. A carriage locking mechanism for locking the carriage in a stop position includes a locking magnet and a magnetic member fixed directly to the yoke and the carriage, respectively. The magnetic member is attracted by the magnetic force of the locking magnet to lock the carriage in the stop position, when the carriage is rotated to the stop position. An elastic member is fitted on the locking magnet so as to abut against the magnetic member to relieve the shock and to define a predetermined gap between the magnetic member and the locking magnet when the carriage is rotated to the stop position.

3 Claims, 5 Drawing Sheets

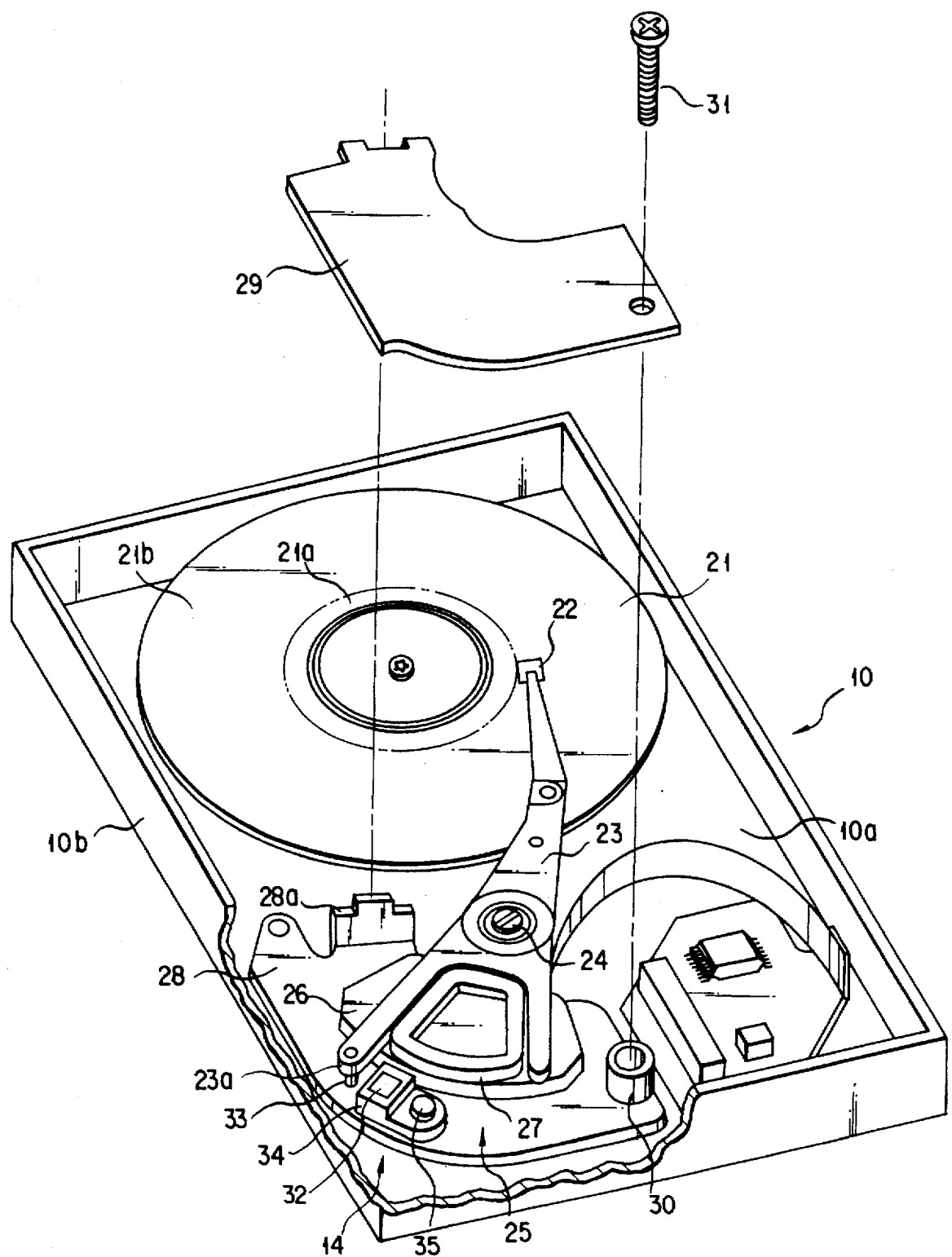
F I G. 1

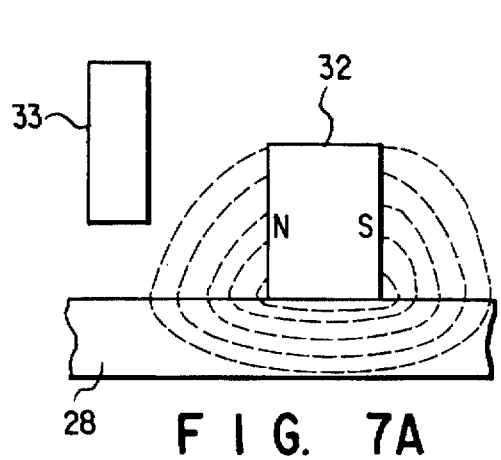
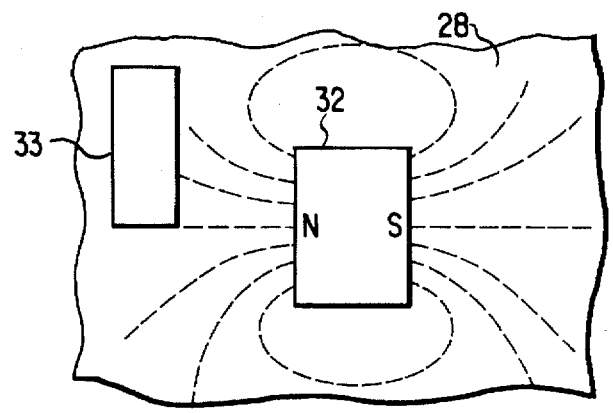
FIG. 7A  FIG. 7B
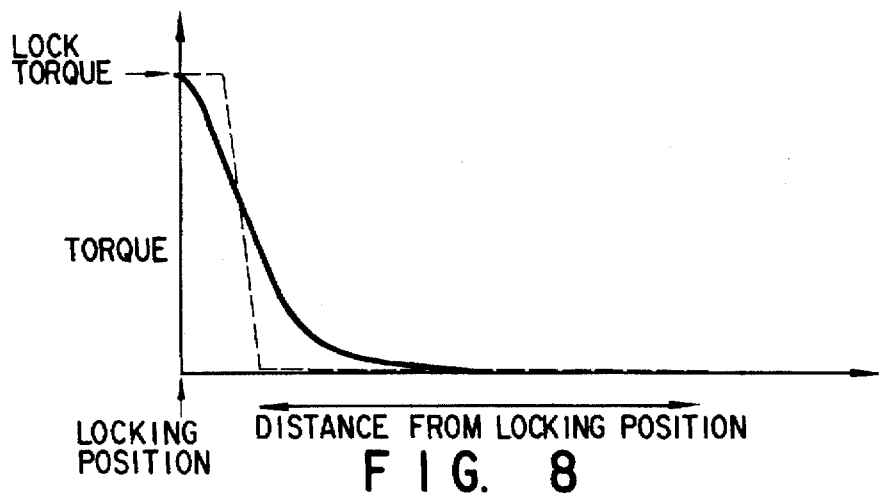
FIG. 8
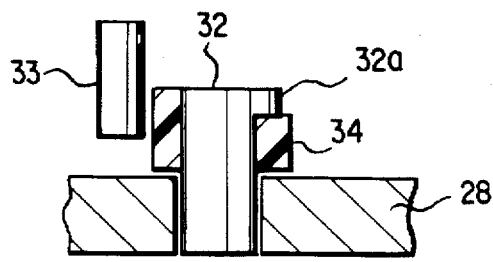
FIG. 9A
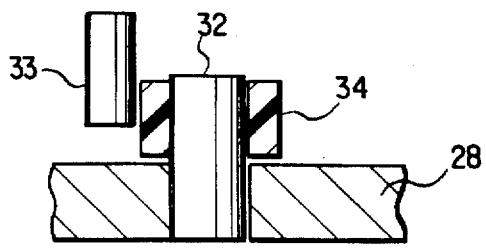
FIG. 9B

DISK APPARATUS

This application is a continuation of application Ser. No. 08/688,821, filed Jul. 31, 1996, abandoned, which is a continuation of application Ser. No. 08/505,994, filed Jul. 21, 1995, abandoned, which is a continuation of application Ser. No. 08/357,095, filed Dec. 15, 1994, abandoned, which is a continuation of Ser. No. 08/173,179, filed Dec. 27, 1993, abandoned.

BACKGROUND OF THE INVENTION

1. Field of the Invention

The present invention relates to a disk drive apparatus, and more particularly, to a disk drive apparatus with a lock mechanism of the magnetic attraction type for locking a magnetic head in a predetermined position, and an assembling method of the apparatus.

2. Description of the Related Art

In a magnetic disk apparatus such as a hard disk drive (HDD) based on a CSS (contact start-stop) system, for example, a CSS zone is provided at the innermost circumferential portion of a disk (record medium) as an area independent of a data zone, in order to prevent the data zone from being flawed when the HDD is started or stopped. When the power supply is off (i.e., disk is stopped), a magnetic head is stationarily in contact with the CSS zone of the disk. When the power supply is on and the disk 21 is rotated, the magnetic head flies above the disk and moved toward the outer circumferential portion or the data zone of the disk by means of a motor as the rotating speed of the disk is increased.

When the power supply is off, the magnetic head may possibly be caused to slide on the surface of the disk by some chance, e.g., by vibration, thereby damaging the disk surface. Accordingly, a lock mechanism is needed to lock the magnetic head in a predetermined position, i.e., on the CSS zone.

Some lock mechanisms of this type utilize the magnetic force of a magnet. In these mechanisms, for example, the magnetic force of a magnet of a voice coil motor (VCM) is used to lock a carriage, which supports the magnetic head, when the head is on the CSS zone.

In general, the carriage is designed for rocking motion around a pivot, and the magnetic head is mounted on the distal end portion of the carriage, and moves on the magnetic disk in the radial direction thereof as the carriage rocks. The VCM, which is used to rock the carriage, includes upper and lower yokes which face each other with a predetermined space between them, and the magnet is fixed to one of these yokes. A voice coil is fixed to the carriage so as to be situated between the upper and lower yokes.

The yokes are provided with a stopper which engages the carriage to restrict the range of rocking motion of the carriage. This stopper is formed of a post for supporting the upper yoke and an elastic member of rubber or the like wound around the post, and is designed so as to abut against one end portion of the carriage when the magnetic head is on the CSS zone.

A columnar attractable member (attraction pin) is provided on the other end portion of the carriage. The attractable member faces a projection on the magnet when the one end portion of the carriage abuts against the stopper, and is attracted in a non-contact manner by the action of the magnetic force of the magnet. Thus, the carriage is locked in a predetermined position.

Two torque characteristics are required of the carriage lock mechanism of the magnetic attraction type described above. One is high locking torque, and the other is low offset torque. The locking torque is a holding force which is used to lock the carriage in a position such that the magnetic head is situated on the CSS zone when the apparatus is nonoperating. When the apparatus is activated, the carriage is driven by the VCM so that the magnetic head is moved from the CSS zone to the data zone. When the magnetic head is situated on the data zone, the carriage can be more easily controlled if it is not subjected to any extra external force. The offset torque is an external force from the magnet which acts on the attraction pin.

Thus, when the carriage is stopped at a lock position with the apparatus nonoperating, the locking torque attributable to leakage flux from the magnet should be as high as possible, and on the other hand, should be quickly damped during operation, and there should be no offset torque (locking torque) in the seek area (data zone) at all, from an idealistic viewpoint.

In the carriage lock mechanism constructed in this manner, the locking torque is in inverse proportion to the square of the size of a gap between the attractable member and the projection on the magnet. Since a number of components are used to form this gap, however, the gap size is subject to variation, and therefore, the locking torque varies considerably. If the variation of the locking torque is substantial, unlocking control is difficult. Usually, therefore, the influence of the locking torque variation is reduced by setting the gap wide in advance.

If the gap is wide, however, the locking torque is damped only slowly, so that the offset torque is high. The high offset torque involves some problems, such as a difficulty in seek control. Conventionally, moreover, the carriage lock mechanism of the magnetic attraction type is designed utilizing the magnetic force of a relatively large part of the magnet which constitutes the VCM. Accordingly, the locking torque is damped so slowly that the offset torque is high.

Described in U.S. Pat. No. 5,025,335 is an apparatus in which a magnet separate from a VCM magnet is used as a locking magnet. According to this apparatus, the locking magnet is supported by means of a yoke member which is independent of a VCM, in order to obtain a sharper closed magnetic field. Thus, a carriage lock mechanism has a complicated construction, and requires use of many components.

SUMMARY OF THE INVENTION

The present invention has been contrived in consideration of these circumstances, and its object is to provide a disk apparatus and an assembling method therefor, in which a carriage can be securely locked by means of a very simple structure, and locking torque can be quickly damped to restrain offset torque as the carriage moves to a seek area.

In order to achieve the above object, a disk apparatus according to the present invention comprises: a case containing a record medium; a carriage movable in the case; head means supported on the carriage, for seeking over the record medium and processing data with respect to the record medium as the carriage moves; drive means for moving the carriage so that the head means is moved to a desired position on the record medium, the drive means including a yoke and a magnet arranged in the case; and carriage locking means including a locking magnet provided at one of the carriage and the yoke, and a magnetic member provided at the other of the carriage and the yoke, for attracting the magnetic member by means of the magnetic force of the locking magnet to lock the carriage in a stop position, where the head means is situated in a predetermined position on the record medium, when the carriage is moved to the stop position.

When the head means is in the predetermined position on the record medium, according to the arrangement described above, the magnetic member is attracted by the magnetic force of the locking magnet which is separated from the magnet of the drive means, whereby the carriage is locked in the stop position. In this case, the locking magnet can be made smaller enough than the magnet of the drive means, so that the damping characteristic of locking torque acting on the magnetic member can be improved. Specifically, upon locking the carriage in the stop position, the carriage can be securely locked with a sufficient locking torque. When the carriage is unlocked, moreover, the locking torque can be quickly damped to restrain offset torque.

Since the locking magnet is provided directly on the yoke of the drive means or the carriage, moreover, the carriage locking means can be arranged having a very simple construction without requiring any special component for supporting the locking magnet.

In the disk apparatus according to the present invention, furthermore, the locking magnet and/or the magnetic member is provided with an elastic member, which relieves the shock of engagement between the locking magnet and the magnetic member and defines a gap between the two.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 to 8 show a magnetic disk apparatus according to an embodiment of the present invention, in which:

FIG. 1 is a perspective view showing an outline of the apparatus;

FIG. 2 is an exploded perspective view showing a locking magnet and an elastic member;

FIG. 5 is a plan view showing a carriage lock mechanism;

FIG. 6 is a sectional view taken along line VI—VI of FIG. 5;

FIG. 7A is a side view schematically showing a flow of magnetic flux from the locking magnet;

FIG. 7B is a plan view schematically showing the flow of magnetic flux from the locking magnet; and FIG. 8 is a diagram showing the relationship between distance and locking torque based on the lock position of the locking magnet;

FIG. 9A is a sectional view showing a modification of an arrangement for mounting the elastic member;

FIG. 9B is a sectional view showing another modification of the arrangement for mounting the elastic member; and FIGS. 10 to 12 show the principal part of a magnetic disk apparatus according to a second embodiment of the present invention, in which:

FIG. 10 is a plan view showing a carriage lock mechanism;

FIG. 11 is a side view of the carriage lock mechanism; and

FIG. 12 is a side view schematically showing a flow of magnetic flux from a locking magnet.

DETAILED DESCRIPTION OF THE PREFERRED EMBODIMENTS

Figure 2:
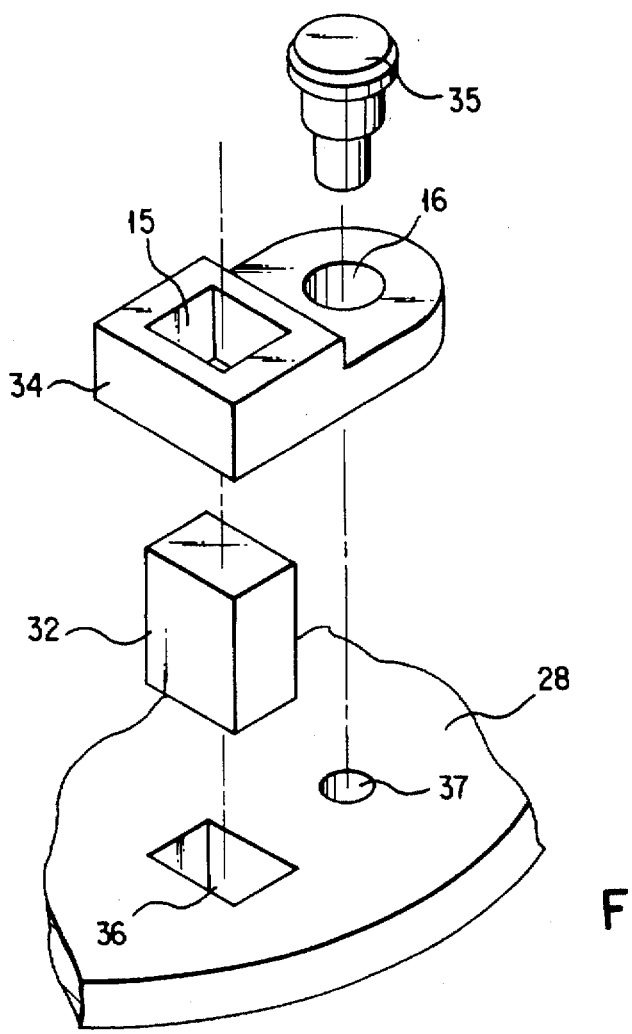

Preferred embodiments of the present invention applied to a magnetic disk apparatus will now be described in detail with reference to the accompanying drawings.

As shown in FIG. 1, the magnetic disk apparatus comprises a rectangular case 10. The case 10 has a rectangular bottom wall 10a and a side wall 10b set on the peripheral edges of the bottom wall. A top opening of the case is closed by a removable cover (not shown).

A magnetic disk 21 for use as a record medium is housed in the case 10, and is rotated by means of a motor (not shown) which is mounted on the bottom wall 10a. The disk 21 has a CSS zone 21a in its innermost circumferential portion an a data zone 21b situated outside the CSS zone and used to record data.

Arranged in the case 10, moreover, are a magnetic head 22 for recording on and retrieving the data from the magnetic disk 21, a carriage 23 supporting the head, and a voice coil motor (VCM) 25 for driving the carriage.

The carriage 23 is rotatably mounted on a shaft 24 which is set up on the bottom wall 10a. The magnetic head 22, which is mounted on the carriage 23, is moved on the magnetic disk 21 in the radial direction thereof as the carriage rotates. In the magnetic disk apparatus based on the CSS system, the magnetic head 22, which is located on the CSS zone 21a in a standby state, is moved to the data zone 21b by means of the carriage 23, to execute data recording or retrieval, in an operating state.

The VCM 25 comprises a magnet 26, a coil 27, and lower and upper yokes 28 and 29. The lower yoke 28 is fixed on the bottom wall 10a of the case 10. One end portion of the lower yoke 28 is bent upward, thus forming an upright portion 28a, and a post 30 is provided at the other end portion of the lower yoke. The upper yoke 29 is fixed to the post 30 and the upper end of the upright portion 28a by means of a screw 31 so as to face the lower yoke 28 across a predetermined space. The magnet 26 is fixed to the lower yoke 28. A rear end portion of the carriage 23, which extends in the direction opposite to the head 22 from the shaft 24, is located and movable between the lower and upper yokes 28 and 29. The voice coil 27 is fixed to the rear end portion of the carriage 23 so as to face the magnet 26. The carriage 23 is rotated by means of an interaction between a magnetic field generated by energizing the coil 27 and the magnetic field generated from the magnet 26.

Further, the magnetic disk apparatus comprises a lock mechanism 14 of the magnetic attraction type for locking the carriage 23 in a position such that the magnetic head 22 is situated on the CSS zone 21a of the magnetic disk 21. As shown in FIGS. 1 and 2, the lock mechanism 14 includes a chip magnet 32, for use as a locking magnet separated from the magnet 26, and an attraction pin 33 as a magnetic member. The chip magnet 32 is smaller enough than the magnet 26 of the VCM 25. In a 2.5-inch disk apparatus, the chip magnet has a cross section measuring about 5 mm by 5 mm or less, preferably about 3 mm by 3 mm or less. The chip magnet 32 is attached directly to the lower yoke 28. More specifically, the lower end portion of the magnet 32 is fitted in a recess 36 (second mounting portion) in the lower yoke 28 and the upper end portion of the magnet projects upward from the lower yoke. The attraction pin 33 is attached directly to one end portion 23a of the carriage 23 so that it can face the chip magnet 32.

An elastic member 34 formed of e.g. rubber is fitted on the chip magnet 32. It relieves a shock produced when the attraction pin 33 is attracted to the magnet 32, and forms a predetermined gap between the pin 33 and the magnet 32. The elastic member 34 is mounted on the lower yoke 28 by means of a fixing pin 35. More specifically, the member 34 is formed having a rectangular first through hole 15, which is penetrated by the chip magnet 32, and a second through hole 16 for the fixing pin 35, as shown in FIG. 2. The pin 35 is fitted into a recess 37 (second mounting portion) in the lower yoke 28 through the hole 16.

In the magnetic disk apparatus of the construction described above, the chip magnet 32 and the elastic member 34 are assembled in the following processes.

Figure 3A:
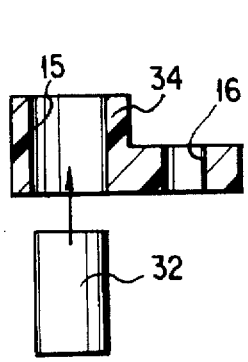
FIGS. 3A, 3B and 3C are diagrams schematically showing processes for assembling the locking magnet and the elastic member.
Figure 3B:
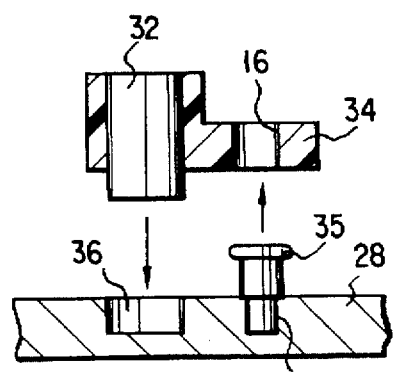
Figure 3C:
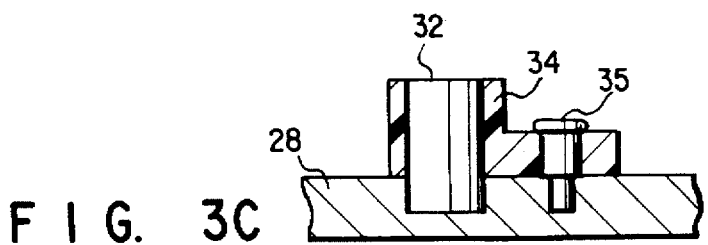

First, the chip magnet 32 is fitted into the through hole 15 of the elastic member 34, as shown in FIG. 3A. Then, the fixing pin 35 is fitted into the recess 37 of the lower yoke 28, as shown in FIG. 3B, and an adhesive agent is applied to the lower end portion of the chip magnet 32 and the lower surface of the elastic member 34. Thereafter, the lower end portion of the magnet 32 is fitted into the recess 36 of the lower yoke 28, and the fixing pin 35 is passed through the through hole 16 of the elastic member 34, as shown in FIG. 3C.

Figure 4A:
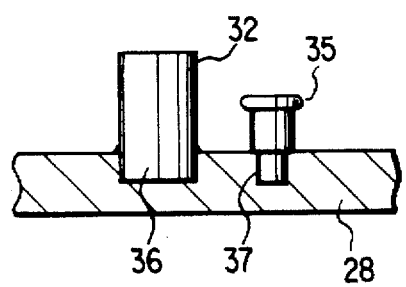
FIGS. 4A, 4B and 4C are diagrams schematically showing alternative processes for assembling the locking magnet and the elastic member.
Figure 4B:
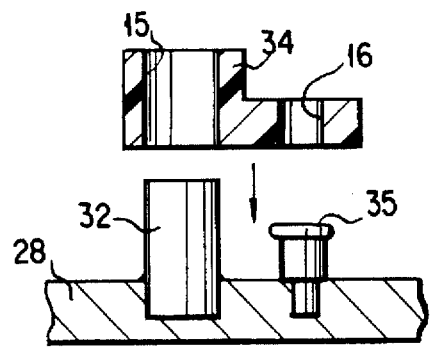
Figure 4C:
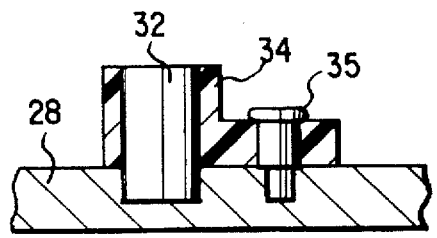

Alternatively, the following assembling processes may be used. The chip magnet 32 is fitted into the recess 36 of the lower yoke 28 after it is coated beforehand with the adhesive agent, and the fixing pin 35 is fitted into the recess 37 of the yoke 28, as shown in FIG. 4A. Thereafter, the elastic member 34 is put on the magnet 32 and the fixing pin 35 from above in a manner such that the magnet 32 and the pin 35 are fitted in the through holes 15 and 16 of the member 34, respectively, as shown in FIGS. 4B and 4C.

Figure 5:
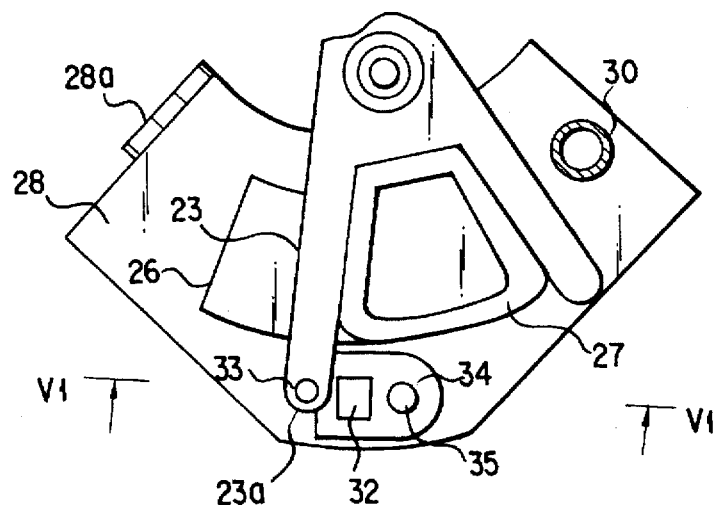
Figure 6:
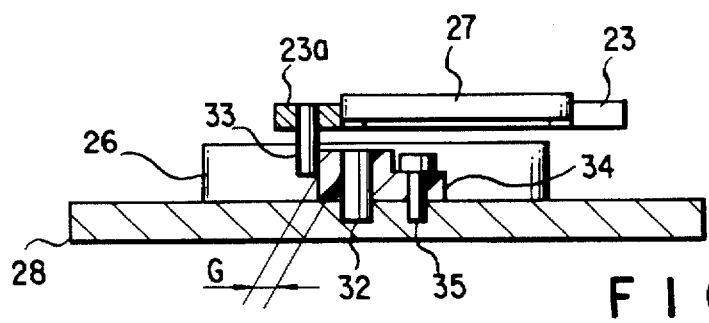

If the power is turned off in the magnetic disk apparatus constructed in this manner, for example, the VCM 25 is driven by means of a reverse starting current which is produced as the disk drive motor coasts, so that the carriage 23 is rotated toward the inner periphery of the magnetic disk 21. When the carriage 23 is rotated to a stop position such that the magnetic head 22 is situated on the CSS zone 21a of the disk 21, as shown in FIGS. 5 and 6, the attraction pin 33, which is fixed to the one end portion 23a of the carriage 23, abuts against the elastic member 34, and faces the chip magnet 32 across the predetermined gap G defined by the elastic member 34. In this state, the pin 33 is attracted by the magnetic force of the magnet 32, so that the carriage 23 is locked in the stop position, and the magnetic head 22 on the CSS zone 21a of the magnetic disk 21.

If the power is turned on, on the other hand, a starting current is supplied to the VCM 25, so that the carriage 23 is rotated toward the outer circumferential of the magnetic disk 21. As the carriage 23 rotates in this manner, the attraction pin 33 is moved away from the chip magnet 32. As a result, the carriage 23 is unlocked, so that the magnetic head 22 is moved from the CSS zone 21a to a desired position on the data zone 21b.

According to the magnetic disk apparatus constructed in this manner, the chip magnet 32 of the lock mechanism 14 is provided separately from the magnet 26 of the VCM 25, and is smaller enough than the magnet 26. Also, the chip magnet 32 is fixed directly to the lower yoke 28, and, as shown in FIGS. 7A and 7B, magnetic flux generated from the magnet 32 is drawn toward the lower yoke 28. Thus, the range of action of the magnetic force of the chip magnet 32 can be made much narrower than that of the magnet 26 of the VCM 25. Accordingly, upon locking, the carriage 23 can be locked with a sufficient locking torque. When the carriage 23 is unlocked, moreover, the locking torque can be quickly damped to restrain offset torque in a seek area as the carriage 23 is moved toward the data zone 21b. Thus, the lock mechanism can enjoy an ideal torque characteristic, as indicated by broken line in FIG. 8. FIG. 8 shows the torque compared with the distance from the lock position, that is, the force of attraction of the chip magnet. In FIG. 8, the full line represents a characteristic obtained when a part of the magnet of the VCM is used as the locking magnet.

According to the embodiment described above, furthermore, the chip magnet 32 is attached directly to the lower yoke 28, so that the carriage lock mechanism can be arranged having a very simple construction without requiring any special component for supporting the magnet 32. Accordingly, magnetic disk apparatuses for 2.5-inch disks or smaller disks, for example, can be reduced in thickness. Since the elastic member 34 surrounding the chip magnet 32 serves as a stopper member, moreover, the carriage 23 can be securely locked in a predetermined position, thus enjoying an improved positioning accuracy. Also, the gap G between the attraction pin 33 and the chip magnet 32 in the lock position can be maintained with high accuracy, so that the carriage 23 can be locked with a desired locking torque without fail.

In the above embodiment, the elastic member 34 is fixed by means of the fixing pin 35. As shown in FIG. 9A, however, a retaining projection 32a for the elastic member 34 may alternatively be formed on the upper end portion of the chip magnet 32 so that the chip magnet doubles as a fixing pin. Alternatively, moreover, the elastic member 34 may be simply fitted on the chip magnet 32 without using any fixing pin, as shown in FIG. 9B.

Figure 10:
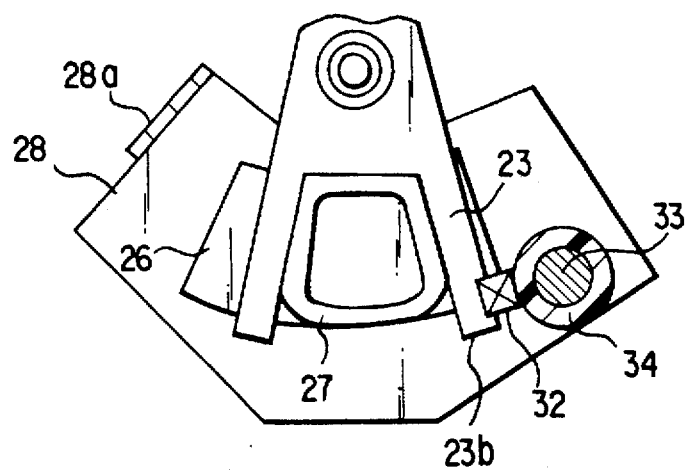
Figure 11:
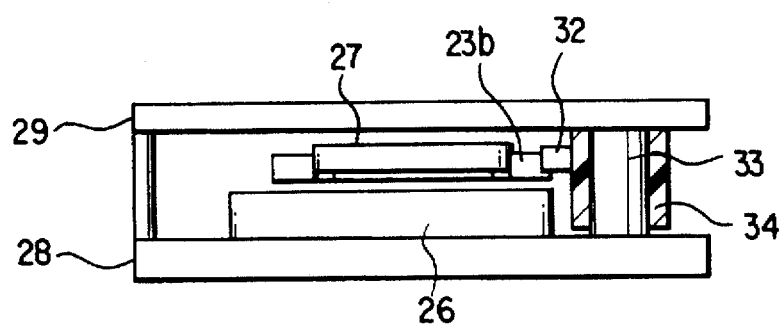
Figure 12:
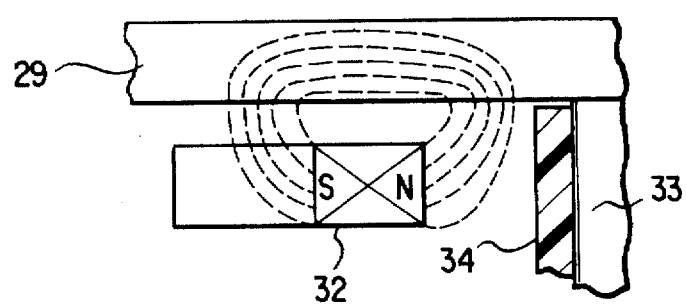

Further, the relative positions of the locking magnet 32 of the carriage lock mechanism and the magnetic member 33 may be changed oppositely to the case of the foregoing embodiment. More specifically, the same effect of the above embodiment can be obtained if the magnet 32 and the member 33 are provided on the carriage 23 and the lower yoke 28, respectively. FIGS. 10, 11 and 12 show a second embodiment of the invention which is based on this arrangement.

According to the second embodiment, the chip magnet 32 for use as a locking magnet is located on an end portion 23b of the carriage 23, and the attraction pin 33 as a magnetic member is provided on the lower yoke 28. In this case, the pin 33 extends across the space between the lower and upper yokes 28 and 29, serves also as a post for supporting the upper yoke 29. A cylindrical elastic member 34 of rubber, which is fitted on the attraction pin 93, serves also as a stopper for restraining the carriage 23 from moving over the stop position. In the description of the first and second embodiments, like portions are designated by like reference numerals, and a detailed description of those portions is omitted.

According to the second embodiment arranged in this manner, when the carriage 23 is rotated to the stop position where the magnetic head 22 (see FIG. 1) is situated on the CSS zone 21a of the magnetic disk 21, the chip magnet 32 on the end portion 23b of the carriage 23 abuts against the elastic member 34, and faces the attraction pin 33 across the predetermined gap G, as shown in FIGS. 10 and 11. When this is done, the magnet 32 is attracted to the pin 33 by its own magnetic force, so that the carriage 23 is locked in the stop position.

Also in the second embodiment, the chip magnet 32 is smaller enough than the magnet 26 of the VCM 25. As shown in FIG. 12, moreover, magnetic flux generated from the magnet 32 is drawn toward the upper yoke 29. Thus, the range of action of the magnetic force of the chip magnet 32 is narrow enough. Accordingly, the carriage 23 can be locked with a sufficient locking torque. After the carriage 23 is unlocked, moreover, the locking torque acting on the attraction pin 33 can be quickly damped to restrain offset torque during seeking operation as the carriage 23 is moved toward the data zone.

It is to be understood that the present invention is not limited to the embodiments described above, and that various changes and modifications may be effected therein by one skilled in the art without departing from the scope or spirit of the invention. Although illustrative embodiments of magnetic disk apparatuses, such as a hard disk drive, floppy disk drive, etc., have been described herein, the present invention may be also applied to any other disk apparatuses, such as a photomagnetic disk apparatus.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A disk apparatus comprising:

a case containing a record medium;

a carriage arranged in the case and rotatable about a central axis;

head means supported on the carriage, for seeking over the record medium and processing data in the record medium as the carriage moves;

drive means for moving the carriage so that the head means is moved to a desired position on the record medium, the drive means including a yoke arranged in the case and having first and second main yokes which face each other with a predetermined distance therebetween and extend in a direction substantially perpendicular to the central axis, means for connecting the first and second main yokes to each other, a coil fixed to the carriage and located between the first and second main yokes, and a drive magnet fixed to one of the first and second main yoke to face the coil, the drive magnet cooperating with the coil to drive the carriage;

an elongated permeable magnetic member provided on the carriage, the magnetic member extending from the carriage and having a longitudinal axis extending in a direction substantially parallel to the central axis of rotation of the carriage; and a locking magnet, independent from the drive magnet, for attracting the magnetic member to lock the carriage in a stop position, whereby the head means is situated in a predetermined position on the record medium when the carriage is moved to the stop position, the locking magnet having a narrower range of action of magnetic force than that of the drive magnet and being fixed directly to one of the first and second main yokes by fitting an end portion of the locking magnet in one of the first and second main yokes.

2. An apparatus according to claim 1, which further comprises an elastic member provided on at least one of the locking magnet and the magnetic member for relieving the shock of engagement between the locking magnet and the magnetic member and defining a predetermined gap between the locking magnet and the magnetic member when the carriage is in the stop position.

3. A disk apparatus comprising:

a case containing a record medium;

a carriage arranged in the case and rotatable about a central axis;

head means supported on the carriage, for seeking over the record medium and processing data in the record medium as the carriage moves;

drive means for moving the carriage so that the head means is moved to a desired position on the record medium, the drive means including a yoke arranged in the case and having first and second main yokes which face each other with a predetermined distance therebetween and extend in a direction substantially perpendicular to the central axis, means for connecting the first and second main yokes to each other, a coil fixed to the carriage and located between the first and second main yokes, and a drive magnet fixed to one of the first and second main yokes to face the coil, the drive magnet cooperating with the coil to drive the carriage;

an elongated permeable magnetic member provided on the carriage, the magnetic member extending from the carriage and having a longitudinal axis extending in a direction substantially parallel to the central axis of rotation of the carriage; and a locking magnet, independent from the drive magnet, for attracting the magnetic member to lock the carriage in a stop position, whereby the head means is situated in a predetermined position on the record medium when the carriage is moved to the stop position, the locking magnet being fixed directly to one of the first and second main yokes and spaced from the drive magnet by fitting an end portion of the locking magnet in one of the first and second main yokes.

* * * * *